(12) United States Patent
Cooper et al.

(10) Patent No.: US 9,384,276 B1
(45) Date of Patent: Jul. 5, 2016

(54) REDUCING LATENCY FOR REMOTELY EXECUTED APPLICATIONS

(75) Inventors: Lee D. Cooper, Lake Forest, CA (US); Venelin N. Efremov, Rancho Santa Margarita, CA (US); Isaac J. Shepard, Ladera Ranch, CA (US); Brian D. Fisher, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1018 days.

(21) Appl. No.: 13/099,753

(22) Filed: May 3, 2011

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| G06F 17/30 | (2006.01) |
| G06F 3/14 | (2006.01) |
| A63F 13/50 | (2014.01) |

(52) U.S. Cl.
CPC ........... *G06F 17/30781* (2013.01); *A63F 13/00* (2013.01); *A63F 13/50* (2014.09); *G06F 3/14* (2013.01)

(58) Field of Classification Search
CPC ........... A63F 13/00; A63F 13/50; G06F 3/14; G06F 17/30781
USPC .................................. 463/31; 13/31
See application file for complete search history.

(56) References Cited

U.S. PATENT DOCUMENTS

| | | | |
|---|---|---|---|
| 7,849,491 B2 | 12/2010 | Perlman | |
| 2010/0167809 A1* | 7/2010 | Perlman et al. | 463/24 |
| 2012/0115601 A1* | 5/2012 | Dietrich et al. | 463/31 |

OTHER PUBLICATIONS

Virtualization Wikipedia page, Apr. 13, 2011, <http://en.wikipedia.org/w/index.php?title=Virtualization&oldid=423881680>.*

* cited by examiner

*Primary Examiner* — Milap Shah
*Assistant Examiner* — Jason Pinheiro
(74) *Attorney, Agent, or Firm* — Thomas | Horstemeyer, LLP

(57) ABSTRACT

Disclosed are various embodiments that reduce video encoding latency for remotely executed applications. An application is executed in response to a client request. A video frame generated by the application is obtained before the video frame is sent to an external port of a graphics device. The video frame is encoded into a compressed video stream. The compressed video stream is sent to the client.

24 Claims, 4 Drawing Sheets

US 9,384,276 B1

REDUCING LATENCY FOR REMOTELY EXECUTED APPLICATIONS

BACKGROUND

A graphics device in a computing device typically has one or more external ports to which monitors or other display devices may be physically attached. Keyboard-video-monitor (KVM) extenders and/or other systems may capture a video signal from the external port of the graphics device, encode the video signal, and send the encoded video signal to another location for rendering on a display device. In such a system, an application executed in one computing device may be viewed by a user at a remotely located device. However, such systems introduce significant encoding latencies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to reducing video encoding latency for applications that are remotely executed over a network. Applications, such as high twitch-action video games and other applications, may be executed in one computing device but controlled by a user at a remotely located computing device. To this end, video, audio, and/or other data generated by the application may be sent over the network to the remotely located computing device. Input commands for the application may be obtained over the network from the remotely located computing device and provided to the application. The video generated by the application is encoded using a video compression encoding in order to be efficiently and reliably transmitted over the network.

One approach to encoding the video involves a capture device coupled to an external port of a graphics device. Such an approach may introduce significant latency due, at least in part, to buffering in the graphics device and the capture device. Such latency may degrade the user experience in high twitch-action video games and/or other latency-dependent applications.

By contrast, various embodiments of the present disclosure achieve a latency reduction relative to such an approach by obtaining the video before it is sent to an external port of a graphics device. In some examples, the video may be rendered in software and may be captured before being sent to the graphics device. In other examples, the video may be partially or fully rendered in hardware and may be captured from a back buffer of the graphics device. In some embodiments, the video encoding may introduce up to approximately five milliseconds of latency, or even no latency at all. In the following discussion, a general description of the system and its components is provided, followed by a discussion of the operation of the same.

Figure 1:
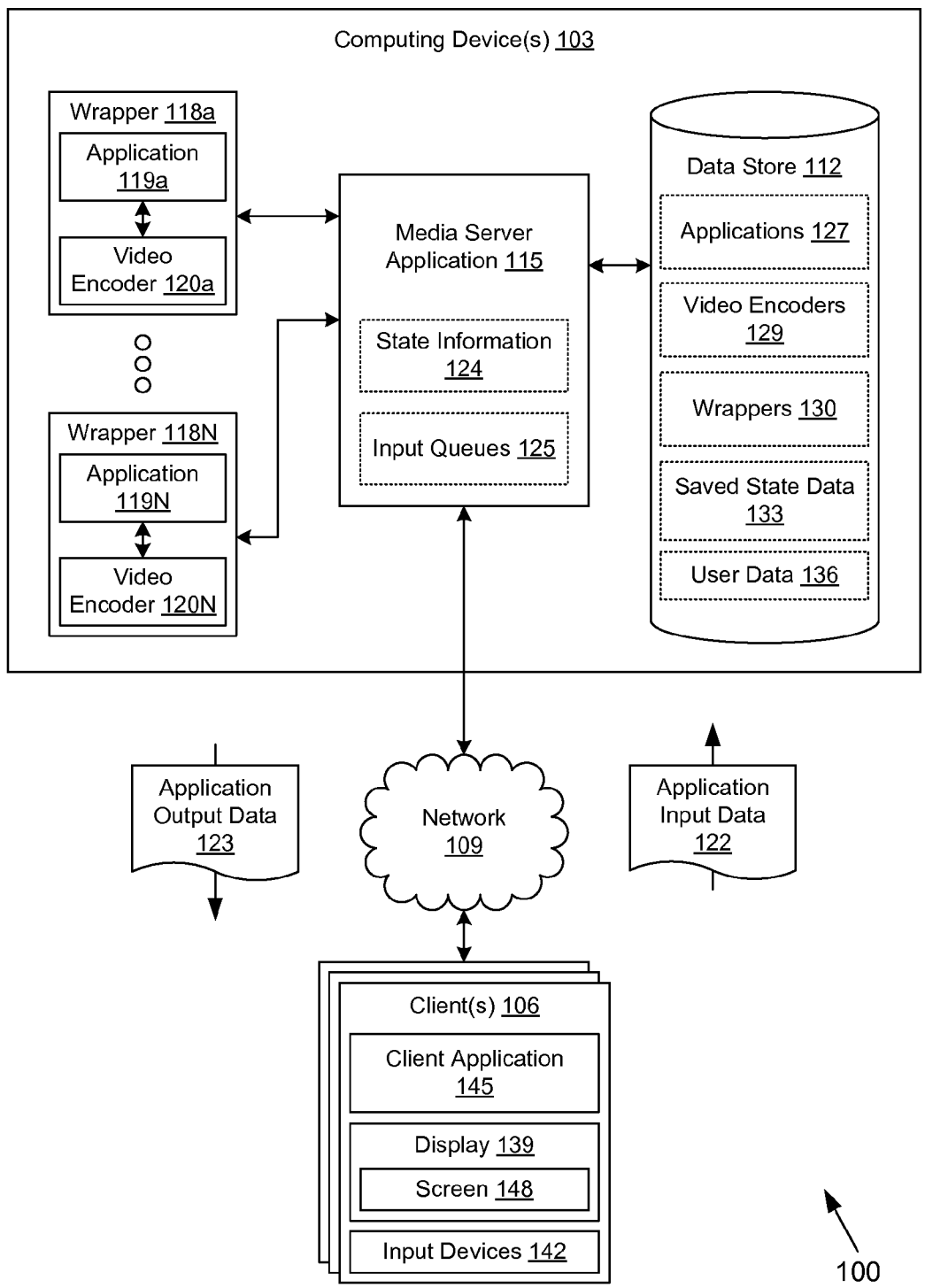
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a media server application 115, a plurality of wrappers 118a . . . 118N, a plurality of applications 119a . . . 119N, a plurality of video encoders 120a . . . 120N, and other applications, services, processes, systems, engines, or functionality not discussed in detail herein. The media server application 115 may correspond to a type of application session server. The media server application 115 is executed to launch applications 119, which are executed within the wrappers 118. The media server application 115 is also executed to obtain application input data 122 from the clients 106 and provide the application input data 122 to the respective wrapper 118.

The media server application 115 is also executed to send application output data 123 that is captured from the application 119 to the clients 106. The media server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The media server application 115 may be configured to maintain state information 124 and input queues 125 associated with the executing applications 119.

In various embodiments, the media server application 115 may be configured to generate a user interface using one or more network pages. The network pages may include the streaming video generated by the emulated application 119. In various embodiments, images of virtual input devices may be rendered in conjunction with the streaming video. For example, a virtual keyboard for the emulated computing device may be included in the network page. Where the emulated computing device is a mobile computing device, an image of the mobile computing device may be included in the network page. The media server application 115 may facilitate interaction with the image of the mobile computing device in conjunction with the application 119. Where the emulated computing device corresponds to a mobile computing device with a screen, the video captured from the application 119 may be surrounded by the image of the mobile computing device, as if the video were shown on the screen of the mobile computing device.

The application 119 may correspond, for example, to a game or other types of applications. As non-limiting examples, the application 119 may correspond to a high twitch-action game, a first-person shooter game, an action game, an adventure game, a party game, a role-playing game, a simulation game, a strategy game, a vehicle simulation game, and/or other types of games. The application 119 may be originally designed for execution in a general-purpose computing device or in a specialized device such as, for example, a smartphone, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, a touchscreen, built-in buttons, etc. In this way, the wrapper 118 is able to provide input commands to the application 119 as if the wrapper 118 emulates a keyboard, a mouse, or another type of input device.

Further, the wrapper 118 is able to obtain a video signal generated by the application 119 as if the wrapper 118 emulates a display device, an audio device, or another type of output device. The wrapper 118 is able to encode the video signal by way of a video encoder 120 into a media stream. The media stream may include an audio signal generated by the application 119 as well. To this end, the wrapper 118 may include various types of video encoders 120, such as, for example, Moving Pictures Experts Group (MPEG) encoders, H.264 encoders, Flash® video encoders, etc. Such video encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the media server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The input queues 125 collect input commands from the application input data 122 for a given application 119. The input commands may be reordered to a correct sequence and delays may be inserted between commands to ensure that they are interpreted correctly when presented to the corresponding application 119.

The data stored in the data store 112 includes, for example, applications 127, video encoders 129, wrappers 130, saved state data 133, user data 136, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The video encoders 129 correspond to the various types of video encoders 120 that may be employed in the computing device 103. Some video encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple application sessions.

The saved state data 133 corresponds to game states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 136 includes various data related to the users of the applications 119, such as, for example, types of computing devices associated with a user, security credentials, application preferences, billing information, a listing of other users that are permitted to join application sessions started by the user, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices 142 may incorporate haptic technologies in order to provide feedback to the user.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input commands provided by the user through one or more of the input devices 142 and send this input over the network 109 to the computing device 103 as application input data 122. In various embodiments, the client application 145 corresponds to a browser application.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in or other client-side code executed within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

Figure 2:
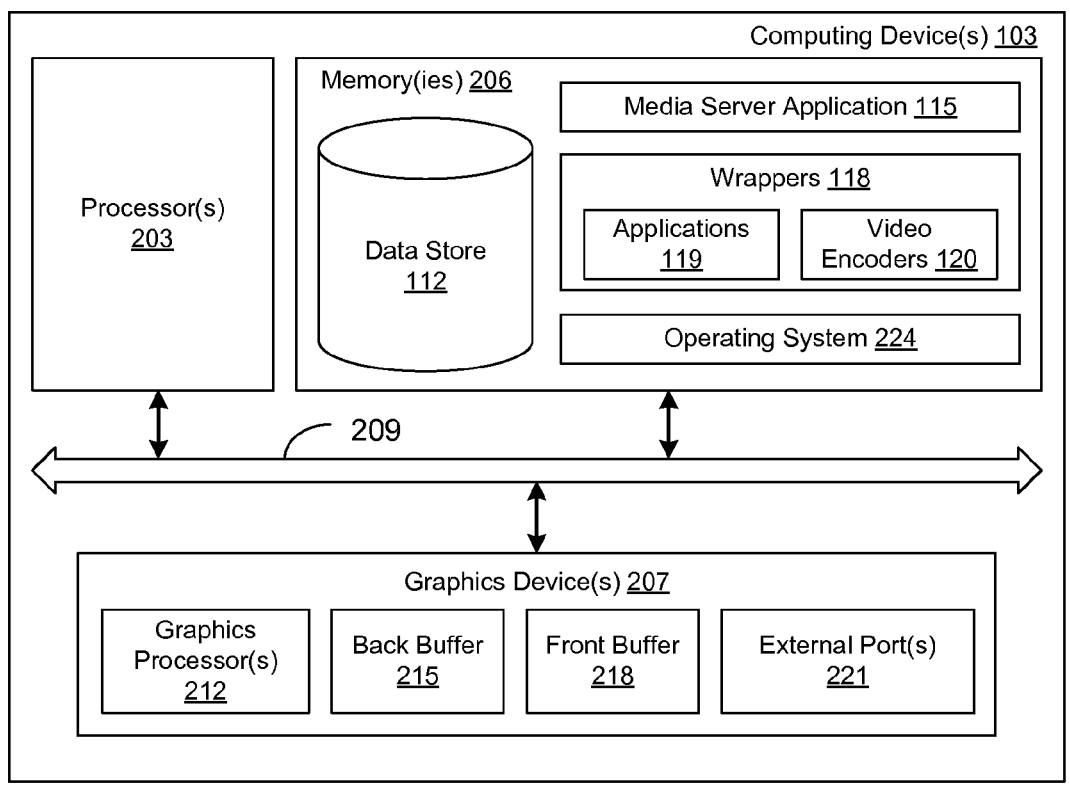
FIG. 2 is a schematic block diagram that provides one example illustration of a computing device employed in the networked environment of FIG. 1 according to various embodiments of the present disclosure.

With reference to FIG. 2, shown is a schematic block diagram of the computing device 103 according to an embodiment of the present disclosure. The computing device 103 includes at least one processor circuit, for example, having a processor 203, a memory 206, and one or more graphics devices 207, all of which are coupled to a local interface 209.

To this end, the computing device 103 may comprise, for example, at least one server computer or like device. The local interface 209 may comprise, for example, a data bus with an accompanying address/control bus or other bus structure as can be appreciated.

The graphics devices 207 may correspond to high-performance graphics hardware, including one or more graphics processors 212. The graphics devices 207 are configured to render video corresponding to the applications 119 executed in the computing device 103. In some embodiments, one or more of the graphics devices 207 may be integrated into the system board of the computing device 103 and may use the processor 203 and/or the memory 206 for rendering. In other embodiments, one or more of the graphics devices 207 may correspond to separate system cards or external devices that may be coupled to the local interface 209.

Each graphics device 207 may include a back buffer 215, a front buffer 218, and external ports 221. The back buffer 215 is configured to store a video frame that corresponds to the next video frame to be displayed. The front buffer 218 is configured to store a video frame that corresponds to the currently displayed video frame. The external ports 221 correspond to physical interfaces to which a video receiving device may be connected to receive a video signal. Such a video receiving device may include a display device such as a monitor, etc., a video recording device, a video encoding device, and/or other video receiving device. In some embodiments, the external ports 221 may be absent from the graphics device 207.

Stored in the memory 206 are both data and several components that are executable by the processor 203. In particular, stored in the memory 206 and executable by the processor 203 are the media server application 115, the wrappers 118, the applications 119, the video encoders 120, and potentially other applications. Also stored in the memory 206 may be a data store 112 and other data. In addition, an operating system 224 may be stored in the memory 206 and executable by the processor 203.

Next, with reference to FIGS. 1 and 2, a general description of the operation of the various components of the networked environment 100 is provided. To begin, a user at the client 106 sends a request to launch an application 119 to the media server application 115. The media server application 115 obtains the corresponding application 127, video encoder 129, and wrapper 130 from the data store 112. The media server application 115 then launches the application 119 in the corresponding wrapper 118. The media server application 115 tracks the status of the application 119 within the state information 124.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper 118 may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The media server application 115 receives the input command, adds it to the input queue 125 for the application 119, and ultimately passes it to the wrapper 118. The wrapper 118 then provides a left mouse button depression to the application 119 by way of a virtualized mouse.

Meanwhile, the graphical output of the application 119 is captured by the wrapper 118 and encoded into a media stream. Additionally, the audio output of the application 119 may be captured and multiplexed into the media stream. The audio output of the application 119 may be captured by hardware devices of the computing device 103 in some embodiments. Alternatively, the audio output of the application 119 may be captured in a manner similar to the graphical output, for example, by intercepting operating system function calls, obtaining the audio from a buffer in an audio device of the computing device 103, or other approaches. The media stream may be configured with timestamps and/or other data to provide synchronization of the video and audio streams when played back by the client application 145. The latency of the audio stream and the latency of the video stream may differ. Thus, the relative latencies of audio and video may be determined and controlled (e.g., by buffering, etc.) to ensure proper synchronization of audio and video. The media stream is transmitted by the media server application 115 to the client 106 over the network 109 as the application output data 123. The client application 145 obtains the application output data 123 and renders a screen 148 on the display 139 in a user interface 250.

Various techniques may be employed in order to reduce latency related to encoding and/or compressing the graphical output of the application 119. To begin, it may be advantageous to have code corresponding to the wrapper 118 and/or the video encoder 120 to be executed within a process of the application 119. Rather than have the application 119 be customized for the system that is described, various libraries relating to OpenGL®, DirectX®, GDI, etc. may be modified to perform the video capture functions. For example, drawing function calls to the operating system 224 or to a common API that are made by the application 119 may be intercepted by the wrapper 118. To this end, the entry points of various library functions may be rewritten.

Where an application 119 renders its graphical output solely in software, the graphical output may be captured before being sent to a graphics device 207, which may be absent. Where an application 119 renders its graphical output with the assistance of hardware (e.g., for rendering textures and/or other complex rendering), the graphical output may be captured from the back buffer 215 of the graphics device 207, rather than the front buffer 218 or the external port 221 of the graphics device 207. The graphical output may be read directly from the back buffer 215 using direct memory access (DMA) to avoid delays involving the processor 203.

The front buffer 218 contains the video frame that is currently being sent out through the external port 221, while the back buffer 215 contains the next video frame that is to be sent out through the external port 221. By capturing from the back buffer 215 instead of the front buffer 218, latency may be reduced by one frame, e.g., 16.7 milliseconds at 60 frames per second. By capturing the video frame before it is sent out through the external port 221, additional latency reductions are realized as additional buffering and latency overhead may be eliminated. Further, graphics devices 207 that lack an external port 221 may be used for rendering with this technique. An additional enhancement may include conversion to an alternate color space (e.g., YUV) to result in faster transfer to and/or from the graphics device 207.

Once the video frame is captured, the frame may be encoded with a low-latency data compression scheme such as H.264. A video encoder 120 that performs zero-latency encoding may be used to further reduce latency. Such a video encoder 120 may lack internal buffering and may encode one video frame at a time. A non-limiting example of such a video encoder 120 is x264. Furthermore, by performing the video encoding within the process of the application 119, latency due to inter-process communication and other multi-process sources may be eliminated. However, in some embodiments, the video encoder 120 may execute as a separate process. In some embodiments, the graphics device 207 may be configured to assist with at least a portion of the encoding (e.g., color space transformation, etc.). Ultimately, various embodiments are able to achieve encoding latency of less than approximately five milliseconds.

Once the video frame is encoded into a compressed video frame, the compressed video frame may be sent from the video encoder 120 to the media server application 115 via a pipe or other form of inter-process communication when the media server application 115 is executed in the same computing device 103 as the video encoder 120. In one embodiment, the same compressed video frame may be sent by the video encoder 120 multiple times to reduce resource consumption and/or improve latency. By increasing the frame rate, latency may be reduced. The media server application 115 is configured to send a media stream that includes the compressed video signal to one or more clients 106.

In some embodiments, a user may start an application 119 at one client 106 and continue the application 119 at another client 106. Furthermore, multiple users at diverse locations may participate in an application 119. As a non-limiting example, an application 119 may have been developed to be executed in one device with multiple controllers. Accordingly, the wrapper 118 may be configured to map input commands from one client 106 to a first virtual controller and input commands from another client 106 to a second virtual controller. As another non-limiting example, an application 119 may have been developed to be executed in one device, where one side of the keyboard controls the first player and the other side of the keyboard controls the second player. Accordingly, the wrapper 118 may be configured to map input commands from one client 106 to keys on one side of a virtual keyboard and input commands from another client 106 to keys on another side of the virtual keyboard.

Various embodiments enable input generated through one type of input device 142 in a client 106 to be transformed by the wrapper 118 into input commands provided to the application 119 through an entirely different type of virtual input device. As a non-limiting example, input generated by an accelerometer in the client 106 may be translated by the wrapper 118 into input provided through a virtual mouse. Thus, completely different kinds of input devices 142 may be used in the application 119 that may not have been contemplated when the application 119 was implemented.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the media server application 115 may be scaled according to the bitrate and/or other characteristics of the connection between the computing device 103 and the client 106 over the network 109.

Figure 3:
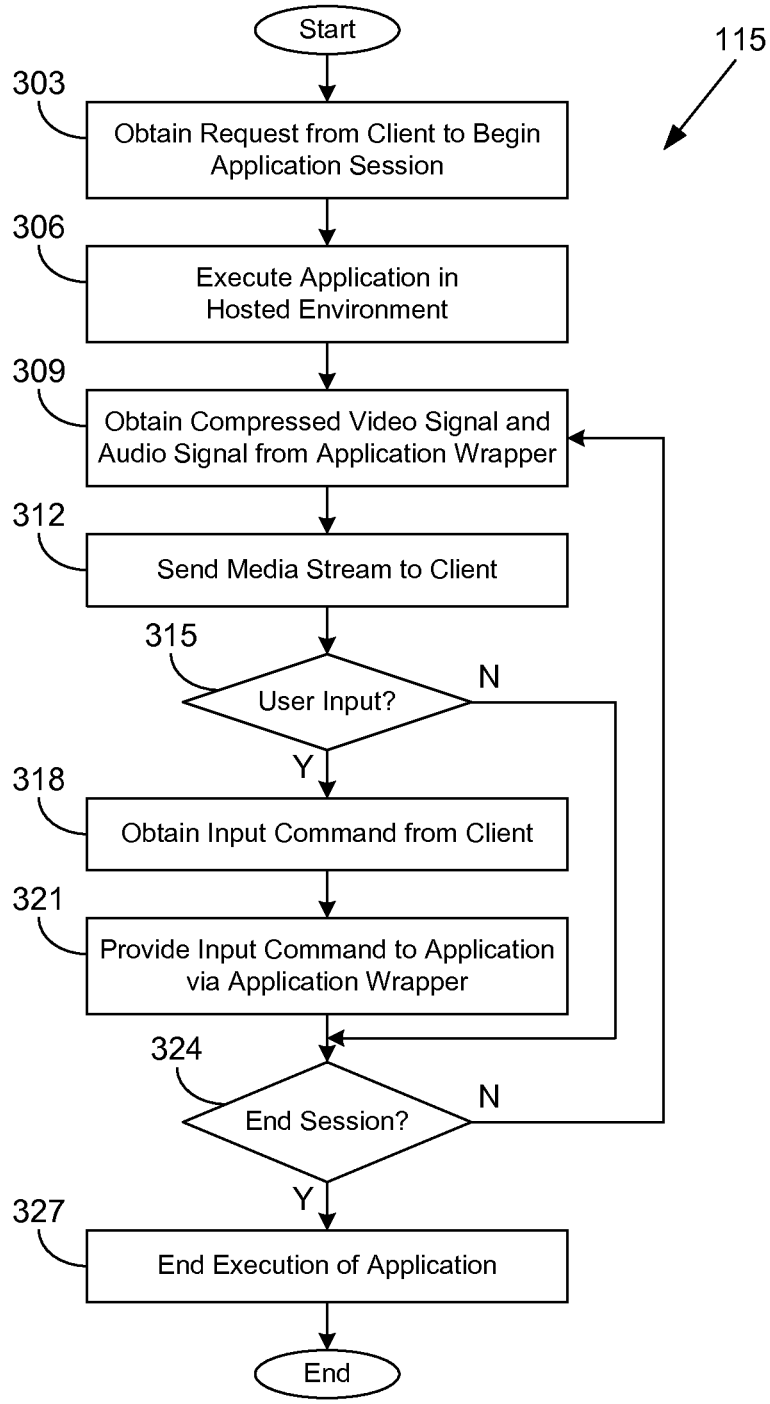
FIG. 3 is a flowchart illustrating one example of functionality implemented as portions of a media server application executed in a computing device in the networked environment of FIG. 1 according to various embodiments of the present disclosure.

Referring next to FIG. 3, shown is a flowchart that provides one example of the operation of a portion of the media server application 115 according to various embodiments. It is understood that the flowchart of FIG. 3 provides merely an example of the many different types of functional arrangements that may be employed to implement the operation of the portion of the media server application 115 as described herein. As an alternative, the flowchart of FIG. 3 may be viewed as depicting an example of steps of a method implemented in the computing device 103 (FIG. 1) according to one or more embodiments.

Beginning with box 303, the media server application 115 obtains a request from a client 106 (FIG. 1) to begin a session of an application 119 (FIG. 1). In some examples, it is noted that multiple clients 106 may join the session of the application 119. In box 306, the media server application 115 loads the corresponding application 127 (FIG. 1), video encoder 129 (FIG. 1), and wrapper 130 (FIG. 1) from the data store 112 (FIG. 1) and executes the application 119 in a hosted environment using the wrapper 118 (FIG. 1) and video encoder 120 (FIG. 1). In box 309, the media server application 115 obtains a compressed video signal and audio signal from the wrapper 118. In some examples, the media server application 115 may obtain other supplemental data from the wrapper 118.

From the compressed video signal, audio signal, and/or other data, the media server application 115 may generate a media stream. In box 312, the media server application 115 sends the media stream to the client 106 in the application output data 123 (FIG. 1). In box 315, the media server application 115 determines whether user input is to be obtained from the client 106. If user input is to be obtained, the media server application 115 continues to box 318 and obtains one or more input commands from the client 106 in the application input data 122 (FIG. 1). In box 321, the media server application 115 provides the input command(s) to the application 119 via the wrapper 118, potentially after reordering using the input queues 125 (FIG. 1). In some embodiments, the wrapper 118 may provide the input command(s) to the application 119 via one or more virtualized input devices. In other embodiments, the wrapper 118 may provide the input command(s) to the application 119 via an application programming interface (API).

The media server application 115 continues to box 324. If the media server application 115 instead determines in box 315 that no user input is to be obtained, the media server application 115 also proceeds to box 324. In box 324, the media server application 115 determines whether the application session is to be ended. If the application session is not to be ended, the media server application 115 returns to box 309 and continues to obtain the compressed video signal and audio signals from the wrapper 118. Otherwise, the media server application 115 proceeds to box 327 and ends execution of the application 119 by the wrapper 118. Thereafter, the portion of the media server application 115 ends.

Figure 4:
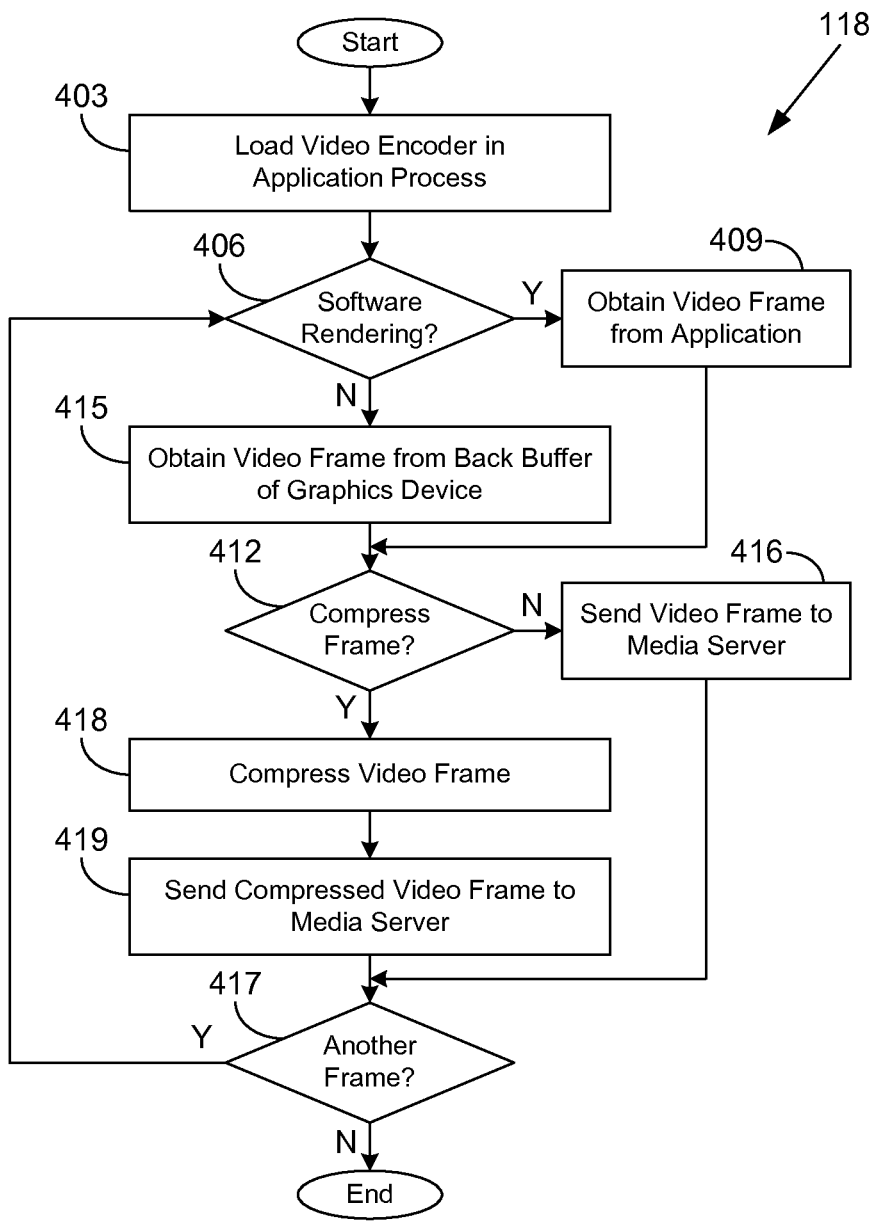
FIG. 4 is a flowchart illustrating one example of functionality implemented as portions of a wrapper executed in a computing device in the networked environment of FIG. 1 according to various embodiments of the present disclosure.

Moving on to FIG. 4, shown is a flowchart that provides one example of the operation of a portion of the wrapper 118 according to various embodiments. It is understood that the flowchart of FIG. 4 provides merely an example of the many different types of functional arrangements that may be employed to implement the operation of the portion of the wrapper 118 as described herein. As an alternative, the flowchart of FIG. 4 may be viewed as depicting an example of steps of a method implemented in the computing device 103 (FIG. 1) according to one or more embodiments.

Beginning with box 403, the wrapper 118 loads a video encoder 120 (FIG. 1) in a process of the application 119 (FIG. 1). In some embodiments, the wrapper 118 may also be loaded in the process of the application 119. It is understood that the video encoder 120 may be a separate process communicating with the wrapper 118 via inter-process communication in some embodiments. In box 406, the wrapper 118 determines whether the video signal generated by the application 119 is generated solely by software-based rendering. If the video signal is generated solely by software-based rendering, the wrapper 118 moves to box 409 and obtains a video frame from the application 119. The wrapper 118 then proceeds to box 412.

If the video signal is not generated solely by software-based rendering, the wrapper 118 instead moves from box 406 to box 415. In box 415, the wrapper 118 obtains the video frame from a back buffer 215 (FIG. 2) of a graphics device 207 (FIG. 2). The wrapper 118 continues to box 412. In box 412, the wrapper 118 determines whether the video frame is to be compressed. If the video frame is not to be compressed, the wrapper 118 proceeds to box 416 and sends the uncompressed video frame to the media server application 115. The wrapper 118 then transitions to box 417.

Alternatively, if the wrapper 118 determines in box 412 that the video frame is to be compressed, the wrapper 118 moves to box 418 and compresses the video frame using the video encoder 120, thereby generating a compressed video frame or signal.

In box 419, the wrapper 118 sends the compressed video frame to the media server application 115. In one embodiment, the media server application 115 is executed in the same computing device 103 as the wrapper 118, and the compressed video frame is sent to the media server application 115 using a pipe or other form of inter-process communication. In other embodiments, the media server application 115 and the wrapper 118 may be executed in different computing devices 103. Various communication approaches (e.g., SOAP, HTTP, remote procedure call (RPC), common object request broker architecture (CORBA), etc.) may be employed to send the compressed video frame to the media server application 115 across a network 109 (FIG. 1). The wrapper 118 continues to box 417.

In box 417, the wrapper 118 determines whether there is another video frame to process from the application 119. If there is another video frame to process, the wrapper 118 returns to box 406. Otherwise, if no other video frames remain to be processed, the portion of the wrapper 118 ends.

With reference again to FIG. 2, it is understood that there may be other applications that are stored in the memory 206 and are executable by the processors 203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 206 and are executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, source code that may be expressed in proper format such as object code that is capable of being loaded into a random access portion of the memory 206 and executed by the processor 203, or source code that may be interpreted by another executable program to generate instructions in a random access portion of the memory 206 to be executed by the processor 203, etc. An executable program may be stored in any portion or component of the memory 206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206 is defined herein as including both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 203 may represent multiple processors 203 and the memory 206 may represent multiple memories 206 that operate in parallel processing circuits, respectively. In such a case, the local interface 209 may be an appropriate network 109 (FIG. 1) that facilitates communication between any two of the multiple processors 203, between any processor 203 and any of the memories 206, or between any two of the memories 206, etc. The local interface 209 may comprise additional systems designed to coordinate this communication, including, for example, performing load balancing. The processor 203 may be of electrical or of some other available construction.

Although the media server application 115, the wrappers 118, the applications 119, the video encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the media server application 115 and the wrapper 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media server application 115, the wrappers 118, the applications 119, the video encoders 120, and the client application 145, that comprises software or code can be embodied in any non-transitory computer-readable medium for use by or in connection with an instruction execution system such as, for example, a processor 203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying at least one program executable in at least one computing device, the at least one program, when executed by the at least one computing device, causing the at least one computing device to at least:
    execute a high twitch-action video game in a hosted environment in the at least one computing device;
    encode a video signal generated by the high twitch-action video game and obtained from a back buffer of a graphics device of the at least one computing device before the video signal is sent to an external port of the graphics device and before the video signal is sent to a front buffer of the graphics device into a compressed video signal with a latency of less than approximately five milliseconds;
    send the compressed video signal in a media stream to at least one client over a network;
    obtain an input command from the at least one client over the network;
    provide the input command to the high twitch-action video game; and
    wherein obtaining the video signal and encoding video signal are configured to be executed in a process of the high twitch-action video game.

2. A system, comprising:
    at least one computing device comprising at least one processor and at least one memory, the at least one memory storing instructions that, when executed by the at least one processor, cause the at least one computing device to at least:
    execute an application in a hosted environment in the at least one computing device;
    encode a video signal obtained from a back buffer of a graphics device before the video signal is sent to an external port of the graphics device into a compressed video signal and before the video signal is sent to a front buffer of the graphics device; and
    send the compressed video signal in a media stream to at least one client.

3. The system of claim 2, wherein the video signal is encoded with a latency of less than approximately five milliseconds.

4. The system of claim 2, wherein the application corresponds to a high twitch-action video game.

5. The system of claim 2, wherein the compressed video signal is in an H.264 format.

6. The system of claim 2, wherein the hosted environment is configured to virtualize at least one resource of the at least one computing device.

7. The system of claim 2, wherein obtaining the video signal comprises obtaining the video signal from the application before the video signal is rendered in the graphics device.

8. The system of claim 2, wherein obtaining the video signal performed by a process of the application.

9. The system of claim 8, wherein encoding the video signal performed by the process of the application.

10. The system of claim 8, obtaining the video signal comprises intercepting at least one drawing function call to an operating system of the at least one computing device.

11. The system of claim 2, wherein encoding the video signal is facilitated by a zero-latency video encoder that is configured to encode the video signal without internal buffering.

12. The system of claim 2, wherein encoding the video signal comprises performing at least a portion of the encoding by the graphics device.

13. The system of claim 2, wherein the instructions further cause the at least one computing device to configure the application to generate one video frame of the video signal instead of another video frame of the video signal.

14. The system of claim 2, wherein the executing and encoding are performed by a first one of the at least one computing device, and the sending is performed by a second one of the at least one computing device.

15. The system of claim 2, wherein the graphics device does not include the external port.

16. A method, comprising:
    executing, in at least one computing device, an application in response to a request obtained from at least one client;
    obtaining, in the at least one computing device, a video frame generated by the application before the video frame is sent to an external port of a graphics device;
    encoding, in the at least one computing device, a video frame generated by the application and obtained from a back buffer of a graphics device before the video frame is sent to an external port of the graphics device into a compressed video stream and before the video frame is sent to a front buffer of the graphics device; and
    sending, in the at least one computing device, the compressed video stream to the at least one client.

17. The method of claim 16, wherein the compressed video stream is encoded with a latency of less than approximately five milliseconds.

18. The method of claim 16, wherein the application corresponds to a game application.

19. The method of claim 16, wherein the obtaining and encoding steps are performed as part of a process of the application.

20. The method of claim 16, wherein the video frame is at least in part rendered by the graphics device.

21. The method of claim 16, wherein the video frame is fully rendered by the application.

22. The method of claim 16, wherein the compressed video stream is sent to the at least one client as part of a media stream that includes at least one audio stream.

23. The method of claim 16, wherein the graphics device does not include the external port.

24. The method of claim 16, wherein the compressed video stream is in an H.264 format.

* * * * *